United States Patent
Yamamura et al.

(10) Patent No.: US 12,020,520 B2
(45) Date of Patent: Jun. 25, 2024

(54) DATA COLLECTION DEVICE AND DATA COLLECTION METHOD

(71) Applicant: Mitsubishi Electric Corporation, Tokyo (JP)

(72) Inventors: Tadashi Yamamura, Tokyo (JP); Norishige Emoto, Tokyo (JP); Kenichi Kusano, Tokyo (JP); Kazushi Horie, Tokyo (JP); Tomoya Shirakashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 171 days.

(21) Appl. No.: 17/441,046

(22) PCT Filed: Mar. 26, 2019

(86) PCT No.: PCT/JP2019/012679
§ 371 (c)(1),
(2) Date: Sep. 20, 2021

(87) PCT Pub. No.: WO2020/194485
PCT Pub. Date: Oct. 1, 2020

(65) Prior Publication Data
US 2022/0172525 A1    Jun. 2, 2022

(51) Int. Cl.
  *G07C 5/08* (2006.01)
  *B60R 16/023* (2006.01)
  *H04L 67/12* (2022.01)

(52) U.S. Cl.
  CPC .......... *G07C 5/085* (2013.01); *B60R 16/0231* (2013.01); *H04L 67/12* (2013.01)

(58) Field of Classification Search
  CPC ..... G07C 5/085; B60R 16/0231; H04L 67/12; Y02T 90/16; B60L 3/00
  See application file for complete search history.

(56) References Cited

U.S. PATENT DOCUMENTS

2005/0065678 A1*  3/2005  Smith ............... G07C 5/008
                                                        701/1
2005/0171683 A1*  8/2005  Irie ................. G07C 5/008
                                                        701/2

(Continued)

FOREIGN PATENT DOCUMENTS

| JP | H0690509 A | 3/1994 |
| JP | H10177663 A | 6/1998 |
| JP | 2005243008 A | 9/2005 |
| JP | 2006254045 A | 9/2006 |

OTHER PUBLICATIONS

Notice of Reasons for Refusal dated Dec. 14, 2021, issued in corresponding Japanese Patent Application No. 2021-508452, 5 pages including 3 pages of English Translation.

(Continued)

*Primary Examiner* — Behrang Badii
(74) *Attorney, Agent, or Firm* — BUCHANAN INGERSOLL & ROONEY PC

(57) ABSTRACT

A data collection device that collects data transmitted by serial communication from an on-board instrument connectable to a vehicle information management device that collects data from the on-board instrument includes a data collection unit that collects data transmitted from the on-board instrument.

18 Claims, 5 Drawing Sheets

(56) References Cited

U.S. PATENT DOCUMENTS

| | | | | |
|---|---|---|---|---|
| 2010/0076878 A1* | 3/2010 | Burr | ................ | G06Q 30/04 |
| | | | | 701/123 |
| 2016/0035152 A1* | 2/2016 | Kargupta | ............ | G06F 16/955 |
| | | | | 701/31.5 |
| 2017/0270615 A1* | 9/2017 | Fernandes | ............ | G08G 5/0039 |
| 2021/0070333 A1* | 3/2021 | Chen | ................ | G06Q 50/40 |

OTHER PUBLICATIONS

Office Action dated May 10, 2022, issued in corresponding Japanese Patent Application No. 2021-508452, 6 pages including 4 pages of English Translation.

Office Action issued in corresponding Japanese Patent Application No. 2021-508452, on Jan. 31, 2023, 12 pages including 8 pages of English Translation.

International Search Report (PCT/ISA/210) with translation and Written Opinion (PCT/ISA/237) mailed on Jul. 2, 2019, by the Japan Patent Office as the International Searching Authority for International Application No. PCT/JP2019/012679. (8 pages).

Office Action (Notification of Reason for Refusal) issued Aug. 10, 2021, by the Japan Intellectual Property Office in corresponding Japanese Patent Application No. 2021-508452, and an English Translation of the Office Action. (6 pages).

Office Action dated Mar. 10, 2022, issued in corresponding Indian Patent Application No. 202127042832, 6 pages.

Hearing Notice dated Apr. 23, 2024, issued in the corresponding Indian Patent Application No. 202127042832, 2 pages.

* cited by examiner

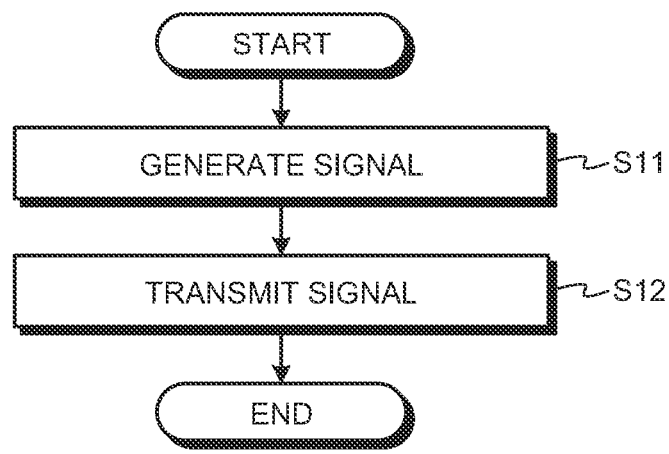

DATA COLLECTION DEVICE AND DATA COLLECTION METHOD

FIELD

The present invention relates to a data collection device to be installed on a train and a data collection method.

BACKGROUND

In a train, data indicating an operating state is collected from on-board instruments such as a power conversion device, a brake control device, and an air conditioner, and is used for travel control of the train, maintenance of the train, and the like. Patent Literature 1 discloses a technique in which a monitoring central device collects data from each on-board instrument through a command transmission line and an information transmission line connecting a plurality of vehicles.

CITATION LIST

Patent Literature

Patent Literature 1: Japanese Patent Application Laid-open No. H06-90509

SUMMARY

Technical Problem

In a recently manufactured vehicle, an in-vehicle network based on Ethernet (registered trademark) or the like is constructed, and a large capacity of data can be transmitted. For example, by directly performing Ethernet (registered trademark) communication or wireless communication between a vehicle management device and an on-board instrument, it is possible to acquire data transmitted from the on-board instrument as it is. However, in a conventional vehicle such as that described in Patent Literature 1 having a small transmission capacity between a monitoring central device and a terminal device or between the monitoring central device and a display device, when the monitoring central device collects data indicating an operating state from each on-board instrument, it is necessary to limit data depending on the small transmission capacity and then to collect the limited data, and when data is displayed on a display screen of the vehicle, it is necessary to more carefully select data from the data acquired by the monitoring central device from each on-board instrument and to transmit the selected data to a display device. Therefore, in order to collect data indicating an operating state from each on-board instrument without limitation, it is necessary to additionally provide each on-board instrument with a dedicated interface for data collection, which is a problem.

The present invention has been made in view of the above, and an object thereof is to provide a data collection device capable of collecting data transmitted from an on-board instrument installed on a train without reviewing a system of a vehicle information management device and additionally providing the on-board instrument with an interface.

Solution to Problem

In order to solve the above-described problem and achieve the object, the present invention provides a data collection device that collects data transmitted by serial communication from an on-board instrument connectable to a vehicle information management device that collects data from the on-board instrument. The data collection device includes a data collection unit that collects data transmitted from the on-board instrument.

Advantageous Effects of Invention

According to the present invention, the data collection device achieves an effect that it is possible to collect data transmitted from an on-board instrument installed on a train without reviewing a system of a vehicle information management device and additionally providing the on-board instrument with an interface.

BRIEF DESCRIPTION OF DRAWINGS

FIG. 8 is a flowchart illustrating operations of the data collection device according to the second embodiment.

DESCRIPTION OF EMBODIMENTS

Hereinafter, a data collection device and a data collection method according to each embodiment of the present invention will be described in detail with reference to the drawings. The present invention is not limited to the embodiments.

First Embodiment

Figure 1:
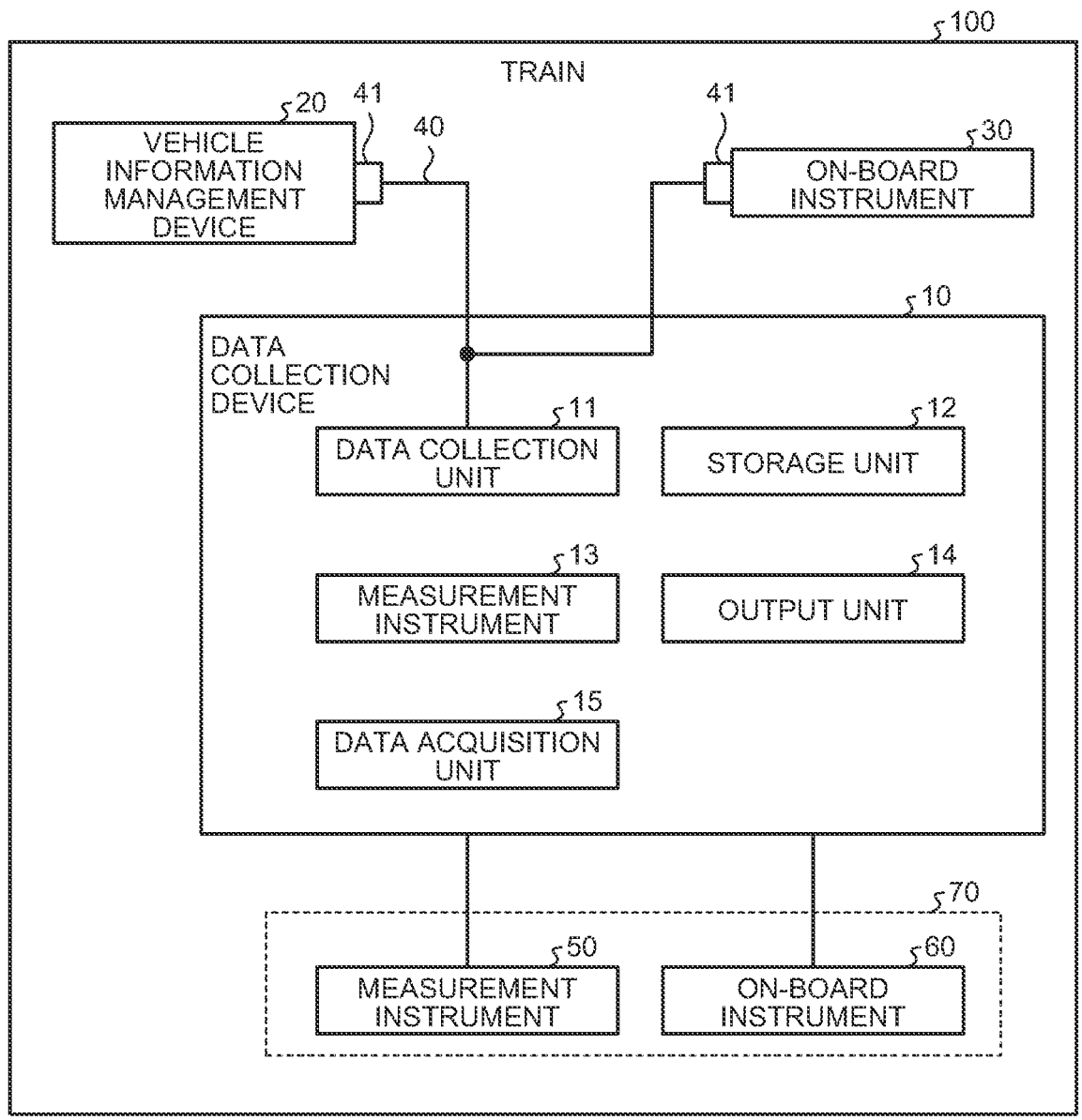
FIG. 1 is a diagram illustrating an example configuration of a data collection device according to a first embodiment.

FIG. 1 is a diagram illustrating an example configuration of a data collection device 10 according to a first embodiment of the present invention. The data collection device 10 is a device installed on a train 100. The train 100 may include a plurality of vehicles or may be a single train including one vehicle. The data collection device 10 is connected to a vehicle information management device 20 and an on-board instrument 30 via a transmission line 40 and a connector 41. In addition, the data collection device 10 is connected to a measurement instrument 50 and an on-board instrument 60.

The vehicle information management device 20 collects data indicating an operating state of the on-board instrument 30 transmitted from the on-board instrument 30 via the transmission line 40 and the connector 41. For example, the vehicle information management device 20 displays a part of the collected data on a display device (not illustrated).

The on-board instrument 30 is an on-board instrument connectable to the vehicle information management device 20. The on-board instrument 30 is, for example, a power conversion device, a brake control device, an auxiliary power supply device, a main motor, an engine, or the like, but is not limited thereto. The on-board instrument 30 transmits, for example, data indicating an operating state such as abnormality information of each on-board instrument and air-conditioning temperature information, and a command to another instrument, and the like to the vehicle information management device 20 via the transmission line 40 and the connector 41. When the on-board instrument 30 receives, after start-up, a data transmission request from the vehicle information management device 20, the on-board instrument 30 transmits data indicating the operating state to the vehicle information management device 20 continuously at regular intervals.

The transmission line 40 is a transmission line used for communication between the vehicle information management device 20 and the on-board instrument 30. Here, the vehicle information management device 20 and the on-board instrument 30 perform communication by serial communication. The serial communication is, for example, communication using a transmission method in accordance with a communication standard of recommended standard (RS) 485. The transmission line 40 is a transmission line used in a transmission method based on serial communication, which is not a transmission method in which a communication destination is designated and transmission is performed such as Ethernet (registered trademark). Therefore, even if the data collection device 10 is connected between the vehicle information management device 20 and the on-board instrument 30 as illustrated in FIG. 1, transmission can be performed between the vehicle information management device 20 and the on-board instrument 30, and transmission can be performed also between the data collection device 10 and the on-board instrument 30.

Figure 2:
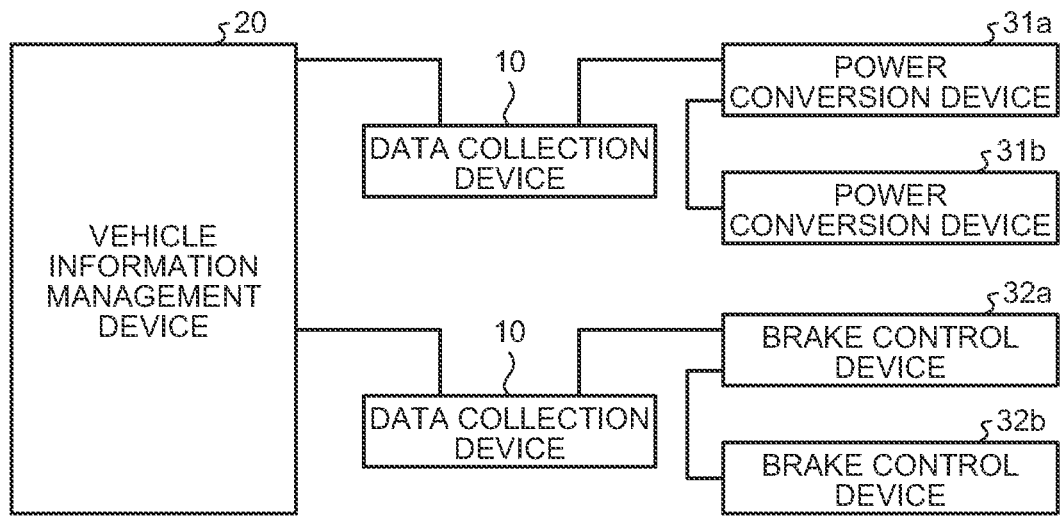
FIG. 2 is a diagram illustrating a first connection example of the data collection device according to the first embodiment.
Figure 3:
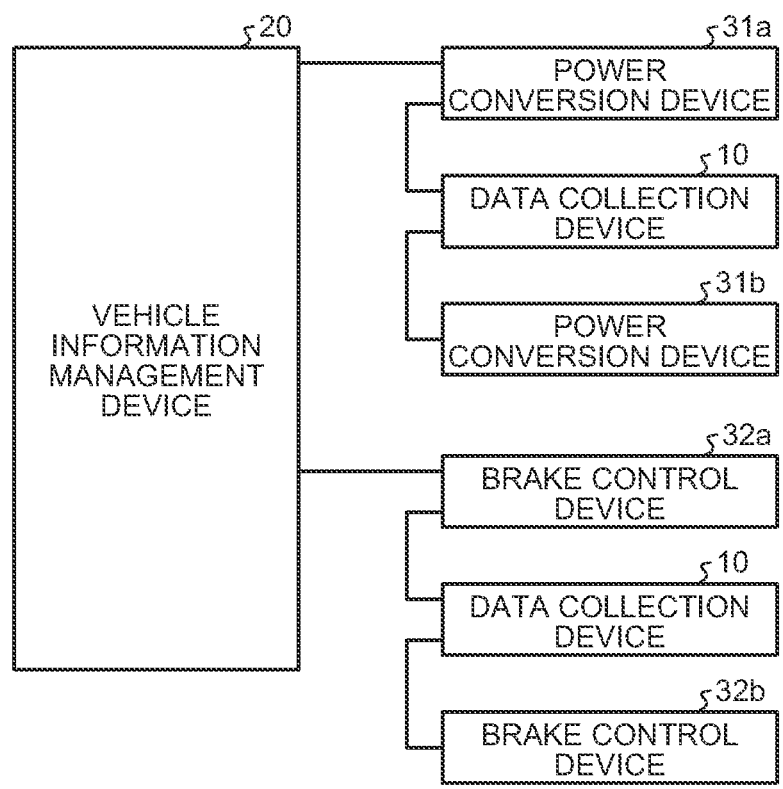
FIG. 3 is a diagram illustrating a second connection example of the data collection device according to the first embodiment.

The number of data collection devices 10 provided on the train 100 is the same as the number of on-board instruments 30 from which data is desired to be collected. The number of data collection devices 10 provided may be the number of types of the on-board instruments 30 from which data is desired to be collected. In addition, a plurality of data collection devices 10 may be provided for one on-board instrument 30. FIG. 2 is a diagram illustrating a first connection example of the data collection device 10 according to the first embodiment. FIG. 3 is a diagram illustrating a second connection example of the data collection device 10 according to the first embodiment. In FIGS. 2 and 3, power conversion devices 31*a* and 31*b* and brake control devices 32*a* and 32*b* are examples of the on-board instrument 30. As illustrated in FIGS. 2 and 3, the on-board instruments 30 are daisy-chained for each type, and are connected to the vehicle information management device 20.

The data collection device 10 can collect data without changing the configurations of the vehicle information management device 20 and the on-board instrument 30 by branching and wiring the transmission line 40 as illustrated in FIG. 1. In FIG. 2, branching is performed inside each of the data collection devices 10, but the branching may be performed by using, for example, a cable outside each of the data collection devices 10.

Each data collection device 10 may be connected between the vehicle information management device 20 and the on-board instrument 30 as illustrated in FIG. 2, or may be connected between the on-board instruments 30 as illustrated in FIG. 3. The connection examples of the data collection devices 10 illustrated in FIGS. 2 and 3 are merely examples, and there is no limitation thereto. The data collection devices 10 may be each connected to an end of the daisy-chained on-board instrument 30 as in a state obtained by removing the power conversion device 31*b* and the brake control device 32*b* from FIG. 3. The end is a side of the daisy-chained on-board instrument 30, the side being opposite to a side to which the vehicle information management device 20 is connected. In addition, one data collection device 10 may collect data transmitted from the power conversion devices 31*a* and 31*b* to the vehicle information management device 20 and data transmitted from the brake control devices 32*a* and 32*b* to the vehicle information management device 20. In the train 100, by connecting the data collection devices 10 as illustrated in FIG. 2 or 3, the data collection devices 10 can collect data transmitted by serial communication from the on-board instruments 30 without changing the configurations of the vehicle information management device 20 and the on-board instruments 30.

The measurement instrument 50 is a temperature sensor, a global positioning system (GPS) that measures a position, a vibration sensor, or the like, installed around the on-board instrument 30 or 60, or the like. The on-board instrument 60 is an on-board instrument that is not connected to the vehicle information management device 20, that is, an on-board instrument that is additionally installed on the train 100. The on-board instrument 60 is, for example, a pantograph, a truck, a monitoring camera, or the like. The measurement instrument 50 and the on-board instrument 60 that are not connected to the vehicle information management device 20 are collectively referred to as an external instrument 70.

The data collection device 10 collects data transmitted by serial communication from the on-board instrument 30 connectable to the vehicle information management device 20 that collects data from the on-board instrument 30. The data collection device 10 collects data transmitted from the on-board instrument 30 to the vehicle information management device 20, or from the vehicle information management device 20 to the on-board instrument 30 via the transmission line 40 and the connector 41. A configuration of the data collection device 10 will be described. The data collection device 10 includes a data collection unit 11, a storage unit 12, a measurement instrument 13, an output unit 14, and a data acquisition unit 15.

The data collection unit 11 collects data transmitted by serial communication from the on-board instrument 30 to the vehicle information management device 20 via the transmission line 40 and the connector 41. The data collection unit 11 stores the collected data in the storage unit 12.

The measurement instrument 13 is a measurement instrument installed inside the data collection device 10. The measurement instrument 13 is, for example, a timepiece that measures time, an acceleration sensor that detects acceleration of the train 100, a temperature sensor that measures temperature around the data collection device 10, a GPS that measures a position, a vibration sensor, or the like. The data collection device 10 may include one measurement instrument 13 or a plurality of measurement instruments 13.

The data acquisition unit 15 acquires data from the measurement instrument 50 and the on-board instrument 60 outside the data collection device 10, that is, the external instrument 70. For example, in a case where the measurement instrument 50 is a temperature sensor, the data acquisition unit 15 acquires data about a measurement value of temperature from the measurement instrument 50, and in a case where the on-board instrument 60 is a monitoring camera, the data acquisition unit 15 acquires image data of the monitoring camera from the on-board instrument 60.

The storage unit 12 stores and accumulates the data collected by the data collection unit 11. In a case where the data collection unit 11 acquires a measurement value of the measurement instrument 13, the storage unit 12 stores and accumulates the data collected by the data collection unit 11 together with the measurement value of the measurement instrument 13. In a case where the data acquisition unit 15 acquires data of the external instrument 70, the storage unit 12 stores and accumulates the data collected by the data collection unit 11 together with the data of the external instrument 70. In a case where the data collection unit 11 acquires a measurement value of the measurement instrument 13 and the data acquisition unit 15 acquires data of the external instrument 70, the storage unit 12 stores and accumulates the data collected by the data collection unit 11 together with the measurement value of the measurement instrument 13 and the data of the external instrument 70.

The output unit 14 outputs the data stored in the storage unit 12. Alternatively, the output unit 14 may directly output the data collected by the data collection unit 11 without via the storage unit 12. The output unit 14 may be, for example, a wireless instrument that transmits the data stored in the storage unit 12 or the data collected by the data collection unit 11 to a terminal device (not illustrated) by wireless communication, or may be an output interface that outputs the data stored in the storage unit 12 or the data collected by the data collection unit 11 to a storage medium (not illustrated) or a display device (not illustrated). The output unit 14 may function as both the wireless instrument and the output interface.

Figure 4:
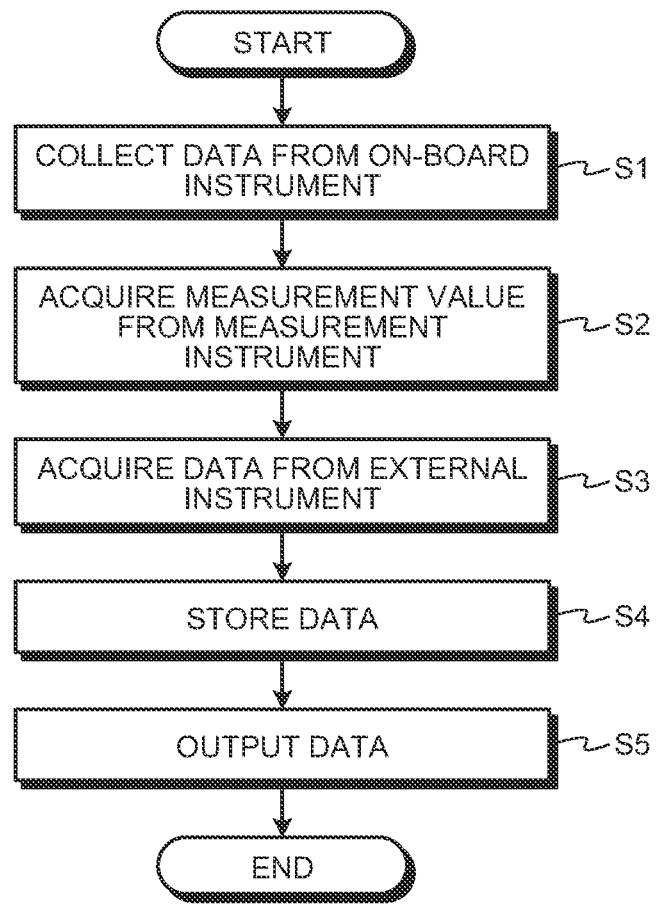
FIG. 4 is a flowchart illustrating operations of the data collection device according to the first embodiment.

Next, operations of the data collection device 10 will be described. FIG. 4 is a flowchart illustrating the operations of the data collection device 10 according to the first embodiment. In the data collection device 10, the data collection unit 11 collects data transmitted from the on-board instrument 30 to the vehicle information management device 20 (step S1). The data acquisition unit 15 acquires a measurement value from the measurement instrument 13 (step S2). The data acquisition unit 15 acquires data from the external instrument 70 (step S3). Specifically, the data acquisition unit 15 acquires data from an instrument that is not connected to the vehicle information management device 20, that is, at least one of the measurement instrument 50 and the on-board instrument 60. The data collection device 10 may change the order of the operations from step S1 to step S3 and perform the operations or may perform the operations at the same time. The data collection unit 11 stores the collected data in the storage unit 12 in association with the measurement value of the measurement instrument 13 and the data of the external instrument 70 acquired by the data acquisition unit 15 (step S4).

Depending on the type of the on-board instrument 30 from which data is desired to be collected, the data collection device 10 may be configured not to include the measurement instrument 13 or may be configured not to be connected to the external instrument 70. In a case where the data collection device 10 does not include the measurement instrument 13, the data collection device 10 skips the operation of step S2. The data collection unit 11 stores the collected data in the storage unit 12 in association with the data of the external instrument 70 acquired by the data acquisition unit 15. In a case where the data collection device 10 is not connected to the external instrument 70, the data collection device 10 skips the operation of step S3. The data collection unit 11 stores the collected data in the storage unit 12 in association with the measurement value of the measurement instrument 13. In a case where the data collection device 10 does not include the measurement instrument 13 and is not connected to the external instrument 70, the data collection device 10 skips the operations of steps S2 and S3. The data collection unit 11 stores only the collected data in the storage unit 12.

The output unit 14 outputs the data of the on-board instrument 30 stored in the storage unit 12 or the data of the on-board instrument 30 collected by the data collection unit 11 without via the storage unit 12 (step S5). The output unit 14 may transmit the data to a terminal device (not illustrated) by wireless communication, or may output the data to a storage medium.

In a case where the data of the on-board instrument 30 is stored in the storage unit 12 in association with the measurement value of the measurement instrument 13, the output unit 14 also outputs the measurement value of the measurement instrument 13 together with the data of the on-board instrument 30. In a case where the data of the on-board instrument 30 is stored in the storage unit 12 in association with the data of the external instrument 70, the output unit 14 also outputs the data of the external instrument 70 together with the data of the on-board instrument 30. In a case where the data of the on-board instrument 30 is stored in the storage unit 12 in association with the measurement value of the measurement instrument 13 and the data of the external instrument 70, the output unit 14 also outputs the measurement value of the measurement instrument 13 and the data of the external instrument 70 together with the data of the on-board instrument 30.

Next, a hardware configuration of the data collection device 10 will be described. In the data collection device 10, the storage unit 12 is a memory. The measurement instrument 13 is a timepiece, a temperature sensor, or the like. The output unit 14 is a wireless instrument or an output interface. The data collection unit 11 and the data acquisition unit 15 are realized by a processing circuitry. The processing circuitry may be a processor that executes a program stored in a memory and the memory, or may be dedicated hardware.

Figure 5:
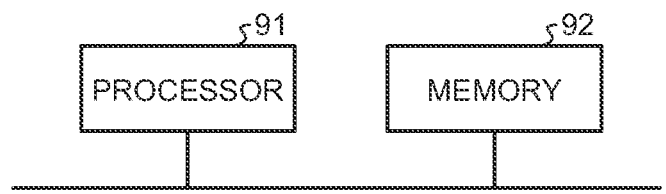
FIG. 5 is a diagram illustrating an example in which a processing circuitry included in the data collection device according to the first embodiment is configured with a processor and a memory.

FIG. 5 is a diagram illustrating an example in which a processing circuitry included in the data collection device 10 according to the first embodiment is configured with a processor and a memory. In a case where the processing circuitry is configured with a processor 91 and a memory 92, functions of the processing circuitry of the data collection device 10 are realized by software, firmware, or a combination of software and firmware. The software or the firmware is described as a program and stored in the memory 92. In the processing circuitry, the processor 91 reads and executes the program stored in the memory 92, thereby realizing the functions. That is, the processing circuitry includes the memory 92 for storing programs with which a process of the data collection device 10 is executed as a result. It can also be said that these programs cause a computer to execute procedures and methods of the data collection device 10.

Here, the processor 91 may be a central processing unit (CPU), a processing device, an arithmetic device, a microprocessor, a microcomputer, a digital signal processor (DSP), or the like. The memory 92 corresponds to, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disk, or a digital versatile disc (DVD).

Figure 6:
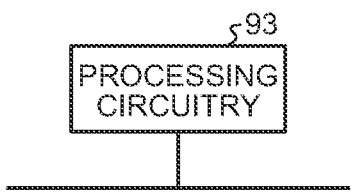
FIG. 6 is a diagram illustrating an example in which the processing circuitry included in the data collection device according to the first embodiment is configured with dedicated hardware.

FIG. 6 is a diagram illustrating an example in which the processing circuitry included in the data collection device 10 according to the first embodiment is configured with dedicated hardware. In a case where the processing circuitry is configured with dedicated hardware, a processing circuitry 93 illustrated in FIG. 6 corresponds to, for example, a single circuit, a composite circuit, a programmed processor, a parallel programmed processor, an application specific integrated circuit (ASIC), a field programmable gate array (FPGA), or a combination thereof. Functions of the data collection device 10 may be separately realized by the processing circuitry 93, or the functions may be collectively realized by the processing circuitry 93.

A part of the functions of the data collection device 10 may be realized by dedicated hardware and another part thereof may be realized by software or firmware. Thus, the processing circuitry can realize each of the above-described functions by dedicated hardware, software, firmware, or a combination thereof.

As described above, according to the present embodiment, the data collection device 10 is connected between the vehicle information management device 20 and the on-board instrument 30, between the on-board instruments 30, or to the on-board instrument 30 as a terminal of the same type of the on-board instruments 30 daisy-chained, collects and stores data transmitted from the on-board instruments 30 to the vehicle information management device 20, and outputs the stored data. As a result, the data collection device 10 can collect data transmitted by serial communication from the on-board instrument 30 without additionally providing an interface dedicated to the on-board instrument 30. In addition, there is no need to change the configuration of the vehicle information management device 20 and the on-board instrument 30, and furthermore, data can be collected without specifying a destination such as an Internet protocol (IP) address, and thereby it is possible to collect data of the on-board instrument 30 while continuing communication between the vehicle information management device 20 and the on-board instrument 30. Furthermore, according to the present embodiment, even in a case where the vehicle information management device 20 limits data depending on a small transmission capacity and then acquires the limited data, it is possible to collect all data output from the on-board instrument 30 including data discarded by the vehicle information management device 20 when limiting the data.

Note that, in the train 100, as long as the on-board instrument 30 is configured to be connectable to the vehicle information management device 20, the data collection device 10 can collect data from the on-board instrument 30 even if the on-board instrument 30 is not actually connected to the vehicle information management device 20. In a case where the on-board instrument 30 is not connected to the vehicle information management device 20, instead of the vehicle information management device 20, the data collection unit 11 in the data collection device 10 requests the on-board instrument 30 to transmit data after start-up of the train 100. The on-board instrument 30 transmits the data of the on-board instrument 30 in response to the data transmission request. The data collection unit 11 collects data transmitted from the on-board instrument 30. The subsequent operations of the data collection device 10 are similar to the above-described operations.

Second Embodiment

In the first embodiment, the method has been described in which the data collection device 10 collects data transmitted by serial communication from the on-board instrument 30 without changing the conventional configurations of the vehicle information management device 20 and the on-board instrument 30. In a second embodiment, a case will be described where a signal such as a control command is transmitted from the data collection device to the on-board instrument 30.

Figure 7:
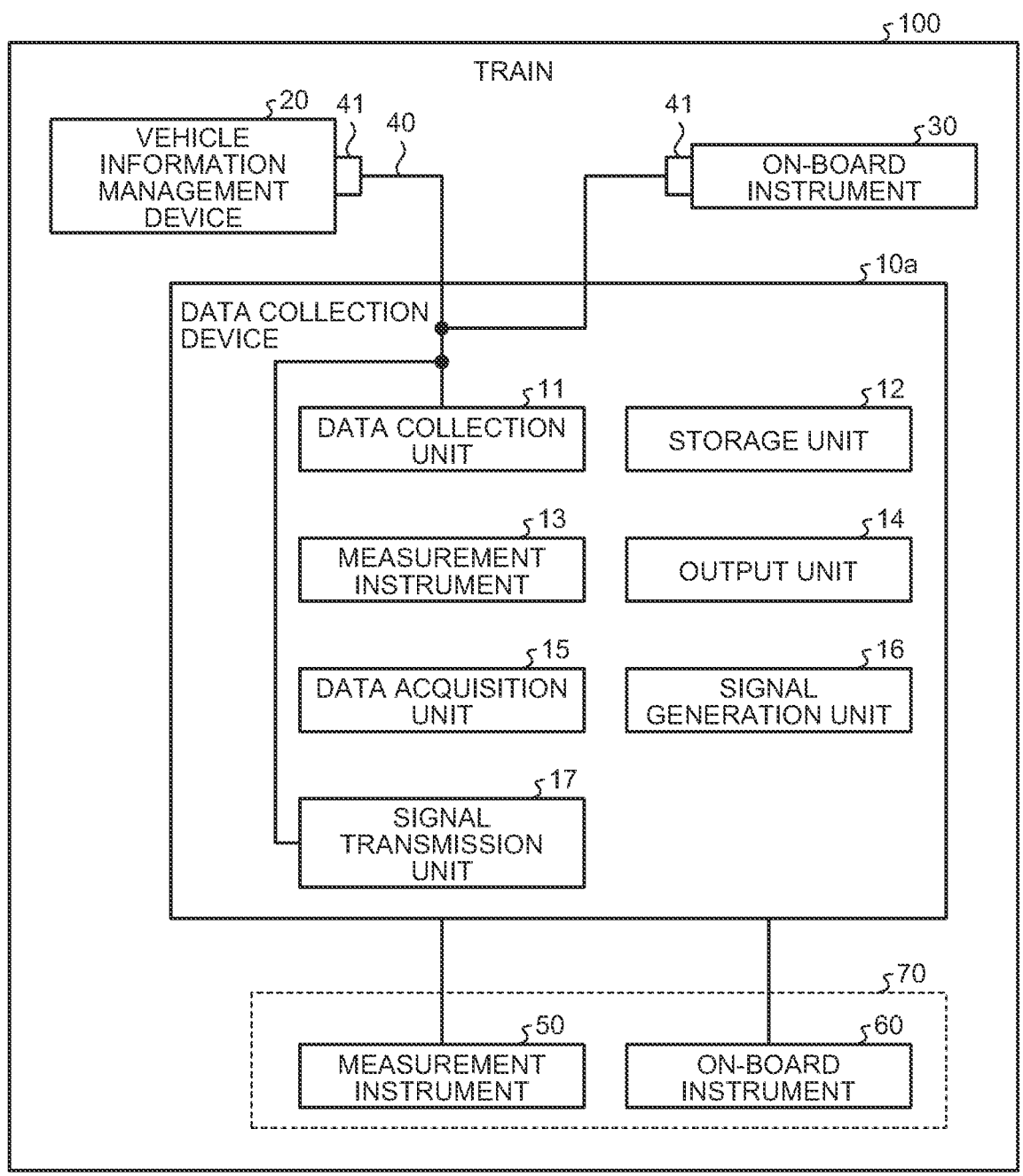
FIG. 7 is a diagram illustrating an example configuration of a data collection device according to a second embodiment.

FIG. 7 is a diagram illustrating an example configuration of a data collection device 10a according to the second embodiment. The data collection device 10a is obtained by adding a signal generation unit 16 and a signal transmission unit 17 to the data collection device 10 of the first embodiment illustrated in FIG. 1.

The signal generation unit 16 generates a signal such as a control command directed to the on-board instrument 30. The signal generation unit 16 may generate a signal upon receiving an instruction from a user, or may generate a signal when data stored in the storage unit 12 falls under a prescribed condition. In a case of generating a signal upon receiving an instruction from the user, the signal generation unit 16 may include an input interface such as a switch that receives the instruction from the user.

The signal transmission unit 17 transmits the signal generated by the signal generation unit 16 to the on-board instrument 30 via the transmission line 40 and the connector 41 through which the data collection unit 11 collects data.

Next, operations of the data collection device 10a will be described. FIG. 8 is a flowchart illustrating the operations of the data collection device 10a according to the second embodiment. First, in the data collection device 10a, the signal generation unit 16 generates a signal such as a control command directed to the on-board instrument 30 (step S11). As described above, the signal generation unit 16 may generate a signal upon receiving an instruction from the user, or may generate a signal when data stored in the storage unit 12 falls under a prescribed condition. The signal transmission unit 17 transmits the signal generated by the signal generation unit 16 to the on-board instrument 30 via the transmission line 40 and the connector 41 (step S12).

Here, in the first embodiment, the data collection device 10 can collect the data transmitted from the on-board instrument 30 without changing the configurations of the vehicle information management device 20 and the on-board instrument 30. The second embodiment is a data collection device and a data collection method for the vehicle information management device 20 and the on-board instrument 30 capable of responding to transmission of a signal from the data collection device 10a. When receiving a signal from the data collection device 10a, the vehicle information management device 20 can respond to transmission of the signal from the data collection device 10a, for example, by ignoring the received signal. The on-board instrument 30 can respond to transmission of a signal from the data collection device 10a, for example, by operating on the basis of the signal received from the data collection device 10a. In the example of FIG. 7, the on-board instrument 30 is connected to the vehicle information management device 20, but this is merely an example, and the on-board instrument 30 may not be connected to the vehicle information management device 20. In the second embodiment, in a case where the train 100 does not include the vehicle information management device 20, instead of the vehicle information management device 20, the data collection device 10a can transmit a signal such as a control command to the on-board instrument 30. Since the data collection device 10a can transmit a signal, it is possible to collect data that has not been able to be collected before without additionally providing the on-board instrument 30 with a dedicated interface.

A hardware configuration of the data collection device 10a will be described. In the data collection device 10a, the signal transmission unit 17 is a communication instrument capable of transmitting a signal to the on-board instrument 30 via the transmission line 40 and the connector 41. The signal generation unit 16 is realized by a processing circuitry. Similarly to the first embodiment, the processing circuitry may be a processor that executes a program stored in a memory and the memory, or may be dedicated hardware.

As described above, according to the present embodiment, the data collection device 10a generates a signal such as a control command directed to the on-board instrument 30 and transmits the signal to the on-board instrument 30. As a result, instead of the vehicle information management device 20, the data collection device 10a can control the on-board instrument 30. The data collection device 10a of the second embodiment is useful particularly in a case where the vehicle information management device 20 is not installed on the train 100.

The configurations described in each embodiment above are merely examples of the content of the present invention and can be combined with other known technology and part thereof can be omitted or modified without departing from the gist of the present invention.

REFERENCE SIGNS LIST 10, 10a data collection device; 11 data collection unit; 12 storage unit; 13, 50 measurement instrument; 14 output unit; 15 data acquisition unit; 16 signal generation unit; 17 signal transmission unit; 20 vehicle information management device; 30, 60 on-board instrument; 31a, 31b power conversion device; 32a, 32b brake control device; 40 transmission line; 41 connector; 70 external instrument; 100 train.

The invention claimed is:

1. A data collection device that is installed on a vehicle or plurality of connected vehicles and collects data transmitted by serial communication from an on-board instrument that is installed on the vehicle or plurality of connected vehicles and is connected, by a transmission line, to a vehicle information management device that is installed on the vehicle or plurality of connected vehicles and collects the data from the on-board instrument, the data collection device comprising:
a data collection circuitry to collect the data transmitted from the on-board instrument via a branch of the transmission line used for the serial communication.

2. The data collection device according to claim 1, comprising:
a storage circuitry to store data collected by the data collection circuitry.

3. The data collection device according to claim 1, comprising:
an output circuitry to output data collected by the data collection circuitry.

4. The data collection device according to claim 2, comprising:
an output circuitry to output data stored in the storage circuitry.

5. The data collection device according to claim 2, comprising:
a measurement instrument, wherein
the data collection circuitry stores collected data in the storage circuitry in association with a measurement value of the measurement instrument.

6. The data collection device according to claim 2, comprising:
a data acquisition circuitry to acquire data from an external instrument, wherein
the data collection circuitry stores collected data in the storage circuitry in association with data of the external instrument acquired by the data acquisition circuitry.

7. The data collection device according to claim 1, wherein
the data collection circuitry collects data transmitted from the on-board instrument to the vehicle information management device.

8. The data collection device according to claim 1, further comprising a second on-board instrument that is not directly connected to the vehicle information management device, wherein the data collection circuitry is configured to 1) request the second on-board instrument to transmit data and 2) collect the data transmitted from the second on-board instrument.

9. The data collection device according to claim 1, comprising:
a signal generation circuitry to generate a signal directed to the on-board instrument; and
a signal transmission circuitry to transmit the signal to the on-board instrument via the transmission line through which the data collection circuitry collects data.

10. A data collection method of a data collection device that is installed on a vehicle or plurality of connected vehicles and collects data transmitted by serial communication from an on-board instrument that is installed on the vehicle or plurality of connected vehicles and is connected, by a transmission line, to a vehicle information management device that is installed on the vehicle or plurality of connected vehicles and collects data from the on-board instrument, the data collection method comprising:
collecting, by a data collection circuitry, the data transmitted from the on-board instrument via a branch of a transmission line used for the serial communication.

11. The data collection method according to claim 10, comprising:
storing, by the data collection circuitry, collected data in a storage circuitry.

12. The data collection method according to claim 10, comprising:
outputting, by an output circuitry, data collected by the data collection circuitry.

13. The data collection method according to claim 11, comprising:
outputting, by an output circuitry, data stored in the storage circuitry.

14. The data collection method according to claim 11, wherein
the data collection circuitry stores the collected data in the storage circuitry in association with a measurement value of a measurement instrument.

15. The data collection method according to claim 11, wherein
the data collection circuitry stores the collected data in the storage circuitry in association with data of an external instrument.

16. The data collection method according to claim 10, wherein
the data collection circuitry collects the data transmitted from the on-board instrument to the vehicle information management device.

17. The data collection method according to claim 10, wherein
the data collection device further comprises a second on-board instrument that is not directly connected to the vehicle information management device, and the data collection circuitry requests the second on-board instrument to transmit the data and collects the data transmitted from the second on-board instrument.

18. The data collection method according to claim 10, comprising:
generating, by a signal generation circuitry, a signal directed to the on-board instrument; and
transmitting, by a signal transmission circuitry, the signal to the on-board instrument via the transmission line through which the data collection circuitry collects data.

* * * * *